US012415766B2

(12) United States Patent
Akahani et al.

(10) Patent No.: US 12,415,766 B2
(45) Date of Patent: Sep. 16, 2025

(54) METHOD OF MANUFACTURING HONEYCOMB STRUCTURE AND HONEYCOMB STRUCTURE

(71) Applicant: NGK Insulators, Ltd., Nagoya (JP)

(72) Inventors: Tatsuya Akahani, Komaki (JP); Shuhei Kuno, Komaki (JP); Ryushiro Akaishi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/067,857

(22) Filed: Dec. 19, 2022

(65) Prior Publication Data
US 2023/0286237 A1  Sep. 14, 2023

(30) Foreign Application Priority Data

Mar. 8, 2022  (JP) .................................. 2022-035494

(51) Int. Cl.
*C04B 41/50* (2006.01)
*C04B 38/00* (2006.01)
*C04B 41/45* (2006.01)

(52) U.S. Cl.
CPC .......... *C04B 41/5096* (2013.01); *C04B 38/00* (2013.01); *C04B 41/4523* (2013.01)

(58) Field of Classification Search
CPC .............. C04B 41/009; C04B 38/0006; C04B 2235/606
See application file for complete search history.

(56) References Cited

U.S. PATENT DOCUMENTS

| 2009/0035558 | A1* | 2/2009 | Jorge | .................... C04B 41/009 |
| | | | | 428/689 |
| 2009/0320315 | A1* | 12/2009 | Horiba | .................... F26B 21/06 |
| | | | | 34/265 |
| 2018/0073410 | A1* | 3/2018 | Bookbinder | ..... B01D 46/24494 |
| 2018/0273434 | A1* | 9/2018 | Kuno | .................... C04B 35/565 |
| 2021/0115825 | A1 | 4/2021 | Miyairi et al. | |
| 2022/0390181 | A1* | 12/2022 | Akahani | ............. F28D 20/0056 |

FOREIGN PATENT DOCUMENTS

| CN | 101646538 A | 2/2010 | |
| JP | 2014-062728 A | 4/2014 | |
| WO | 2020/031434 A1 | 2/2020 | |
| WO | WO-2021171670 A1 * | 9/2021 | ............... F28D 7/16 |

OTHER PUBLICATIONS

Japanese Office Action (with English translation) dated Jul. 15, 2025 (Application No. 2022-035494).
Chinese Office Action (with English translation) dated Jul. 18, 2025 (Application No. 202211681153.8).

* cited by examiner

*Primary Examiner* — Alex A Rolland
(74) *Attorney, Agent, or Firm* — BURR PATENT LAW, PLLC

(57) ABSTRACT

Provided is a method of manufacturing a honeycomb structure capable of manufacturing a honeycomb structure excellent in external dimension accuracy. A method of manufacturing a honeycomb structure includes: a preparation step of preparing a honeycomb molded body; a storage step of storing the honeycomb molded body under a state in which temperature and humidity are adjusted; and a fitting step of inserting the honeycomb molded body after the completion of the storage step into a heated metal tube and then cooling the metal tube.

8 Claims, 3 Drawing Sheets

METHOD OF MANUFACTURING HONEYCOMB STRUCTURE AND HONEYCOMB STRUCTURE

BACKGROUND OF THE INVENTION

This application claims priority under 35 U.S.C. Section 119 to Japanese Patent Application No. 2022-035494 filed on Mar. 8, 2022 which is herein incorporated by reference.

1. FIELD OF THE INVENTION

The present invention relates to a method of manufacturing a honeycomb structure and a honeycomb structure.

2. DESCRIPTION OF THE RELATED ART

A honeycomb structure allows a fluid to flow therein, and hence the use thereof, for example, in a heat exchanger and a filter for exhaust gas purification has been considered. As a method of manufacturing such honeycomb structure, for example, there has been proposed a technology of producing a honeycomb molded body by extrusion molding and then inserting the honeycomb molded body into an outer cylinder member to fit the honeycomb molded body therein (see WO2021/171670). In recent years, there is an increasing demand for improvement in external dimension accuracy of a honeycomb structure. However, with the technology as described in WO2021/171670, there still remains a room for improvement in external dimension accuracy of the honeycomb structure.

SUMMARY OF THE INVENTION

A primary object of the present invention is to provide a method of manufacturing a honeycomb structure capable of manufacturing a honeycomb structure excellent in external dimension accuracy.

According to at least one embodiment of the present invention, there is provided a method of manufacturing a honeycomb structure, including: a preparation step of preparing a honeycomb molded body; a storage step of storing the honeycomb molded body under a state in which temperature and humidity are adjusted; and a fitting step of inserting the honeycomb molded body after the completion of the storage step into a heated metal tube and then cooling the metal tube.

In one embodiment, the method of manufacturing a honeycomb structure further includes, after the storage step and before the fitting step, an outer surface processing step of processing an outer surface of the honeycomb molded body.

In one embodiment, the honeycomb molded body contains SiC.

In one embodiment, the method of manufacturing a honeycomb structure further includes, after the outer surface processing step and before the fitting step, an impregnation step of impregnating a molten metal containing Si into the honeycomb molded body by heating a supply body containing Si under a state in which the supply body containing Si is in contact with the honeycomb molded body.

In one embodiment, the method of manufacturing a honeycomb structure further includes, after the storage step and before the outer surface processing step, an impregnation step of impregnating a molten metal containing Si into the honeycomb molded body by heating a supply body containing Si under a state in which the supply body containing Si is in contact with the honeycomb molded body.

In one embodiment, in the storage step, a variation amount of temperature is 10° C. or less, a variation amount of humidity is 8 g/m$^3$ or less, and a storage time is 1 hour or more.

According to another aspect of the present invention, there is provided a honeycomb structure, including: a honeycomb molded body; and a metal tube having the honeycomb molded body inserted therein. The metal tube includes: a large-diameter portion that is in contact with the honeycomb molded body; and a small-diameter portion that is prevented from being in contact with the honeycomb molded body. When an inner diameter of the small-diameter portion is defined as 100%, an inner diameter of the large-diameter portion is 100.1% or more and 101.0% or less.

In one embodiment, the small-diameter portion is positioned in an end portion of the metal tube.

DESCRIPTION OF THE EMBODIMENTS

Embodiments of the present invention are described below with reference to the drawings. However, the present invention is not limited to the embodiments.

A. Overview of Method of Manufacturing Honeycomb Structure

Figure 1:
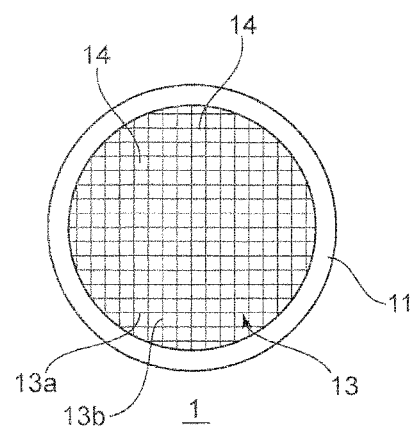
FIG. 1 is an explanatory view for illustrating a method of manufacturing a honeycomb structure according to one embodiment of the present invention and illustrating a step of preparing a honeycomb molded body.
Figure 2:
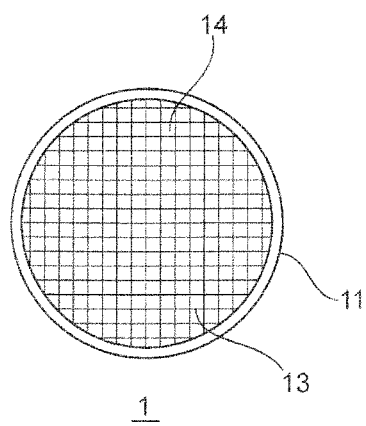
FIG. 2 is a view for illustrating a step of subjecting the honeycomb molded body of FIG. 1 to outer surface processing.
Figure 3:
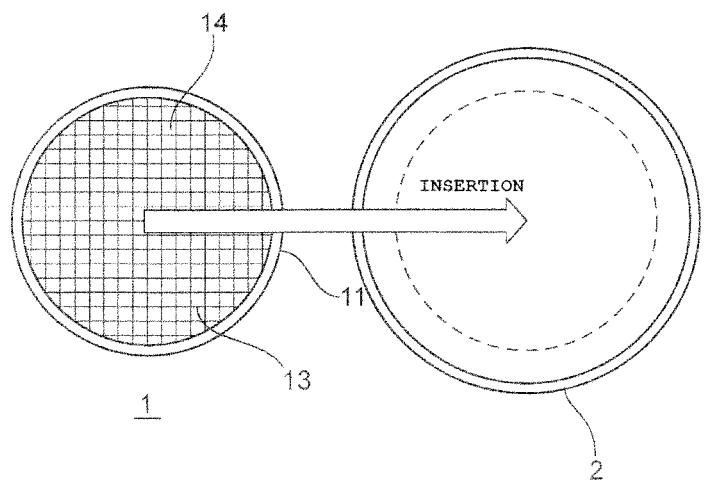
FIG. 3 is a view for illustrating a step of inserting the honeycomb molded body of FIG. 2 into a heated metal tube.
Figure 4:
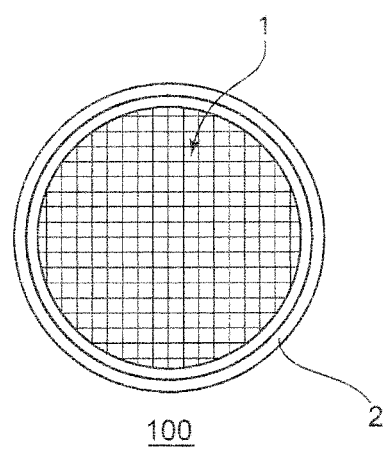
FIG. 4 is a schematic configuration view of the honeycomb structure according to one embodiment of the present invention.
Figure 5:
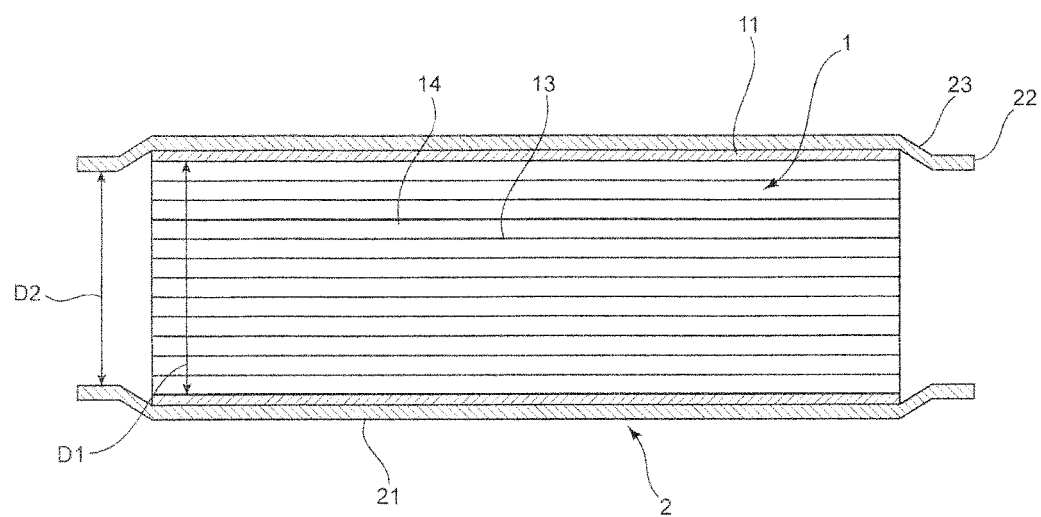
FIG. 5 is a center sectional view of the honeycomb structure of FIG. 4.

FIG. 1 is an explanatory view for illustrating a method of manufacturing a honeycomb structure according to one embodiment of the present invention and illustrating a step of preparing a honeycomb molded body. FIG. 2 is a view for illustrating a step of subjecting the honeycomb molded body of FIG. 1 to outer surface processing. FIG. 3 is a view for illustrating a step of inserting the honeycomb molded body of FIG. 2 into a heated metal tube. FIG. 4 is a schematic configuration view of the honeycomb structure according to one embodiment of the present invention. FIG. 5 is a center sectional view of the honeycomb structure of FIG. 4.

The method of manufacturing a honeycomb structure according to one embodiment of the present invention includes: a preparation step of preparing a honeycomb molded body 1; a storage step of storing the honeycomb molded body 1 under a state in which temperature and humidity are adjusted; and a fitting step of inserting the honeycomb molded body 1 after the completion of the storage step into a heated metal tube 2 and then cooling the metal tube 2. Preferably, the method of manufacturing a honeycomb structure further includes, after the storage step and before the fitting step, an outer surface processing step of processing an outer surface of the honeycomb molded body 1. More preferably, the method of manufacturing a honeycomb structure further includes, after the outer surface processing step and before the fitting step, an impregnation step of impregnating a molten metal containing Si into the honeycomb molded body 1 by heating a supply body containing Si under a state in which the supply body containing Si is in contact with the honeycomb molded body 1.

The inventors have found that the environment in which the honeycomb molded body has been placed before the fitting step (in particular, before the outer surface processing step) influences the external dimension accuracy of the honeycomb structure, to thereby complete the present invention. In one embodiment of the present invention, before the fitting step (in particular, before the outer surface processing step), the honeycomb molded body is stored under a state in which temperature and humidity are adjusted. Thus, the state of the honeycomb molded body after the storage step, in particular, the moisture absorption amount can be stabilized. As a result, after the storage step (in particular, in the outer surface processing step), the honeycomb molded body can be easily adjusted to a desired dimension range, and the external dimension accuracy of the honeycomb structure can be improved.

In one embodiment of the present invention, the variation amount of humidity (absolute humidity) in the storage step is, for example, 8 $g/m^3$ or less, preferably 5 $g/m^3$ or less, more preferably 2 $g/m^3$ or less. The variation amount of humidity (absolute humidity) means a difference between the maximum value and the minimum value of humidity in the storage step. When the variation amount of humidity (absolute humidity) is equal to or less than the above-mentioned upper limit, the moisture absorption amount of the honeycomb molded body after the storage step can be stabilized, and after the storage step (in particular, in the outer surface processing step), the dimension of the honeycomb molded body can be stably adjusted to the desired range. The lower limit of the variation amount of humidity (absolute humidity) in the storage step is typically 0 $g/m^3$ or more.

The humidity (absolute humidity) in the storage step is, for example, set humidity±4.0 $g/m^3$, for example, set humidity±2.5 $g/m^3$, and for example, set humidity±1.0 $g/m^3$. The set humidity is suitably and appropriately set typically within a range of 0 $g/m^3$ or more and 20.0 $g/m^3$ or less.

In one embodiment of the present invention, the variation amount of temperature in the storage step is, for example, 10° C. or less, preferably 8° C. or less, more preferably 5° C. or less, still more preferably 2° C. or less. The variation amount of temperature means a difference between the maximum value and the minimum value of temperature in the storage step. When the variation amount of temperature is equal to or less than the above-mentioned upper limit, after the storage step (in particular, in the outer surface processing step), the dimension of the honeycomb molded body can be more stably adjusted to the desired range. The lower limit of the variation amount of temperature in the storage step is typically 0° C. or more.

The temperature in the storage step is, for example, set temperature±5.0° C., for example, set temperature±4.0° C., for example, set temperature±2.5° C., and for example, set temperature±1.0° C. The set temperature is suitably and appropriately set typically within a range of 0° C. or more and 30° C. or less.

In one embodiment of the present invention, the storage time in the storage step is, for example, 1 hour or more, preferably 5 hours or more. When the storage time is equal to or more than the above-mentioned lower limit, the state of the honeycomb molded body after the storage step, in particular, the moisture absorption amount can be further stabilized.

The details of each of the steps of the method of manufacturing a honeycomb structure is described below.

B. Preparation Step

As illustrated in FIG. 1, a honeycomb molded body 1 is first prepared. The honeycomb molded body 1 has a plurality of cells 14. The cells 14 extend from a first end surface to a second end surface of the honeycomb molded body 1 in an axial direction (length direction) of the honeycomb molded body 1 (see FIG. 5). The cells 14 each have any appropriate shape in a cross-section in a direction orthogonal to the axial direction of the honeycomb molded body 1. As the sectional shape of each of the cells, there are given, for example, a triangular shape, a quadrangular shape, a pentagonal shape, and a polygonal shape of a hexagonal shape or more. All of the cells may be the same in sectional shape and size, or at least some of the cells may be different in sectional shape and size.

The honeycomb molded body 1 in the illustrated example has a columnar shape. The outer diameter and length of the honeycomb molded body may be appropriately set depending on the purpose. The honeycomb molded body 1 in the illustrated example includes an outer peripheral wall 11 and partition walls 13 positioned on an inner side of the outer peripheral wall 11.

The outer peripheral wall 11 has a cylindrical shape. The outer surface of the honeycomb molded body 1 refers to an outer peripheral surface of the outer peripheral wall 11. The thickness of the outer peripheral wall 11 may be appropriately set depending on the application of a honeycomb structure. The thickness of the outer peripheral wall 11 before an outer surface processing step may be, for example, from 1 mm to 10 mm, or, for example, from 2 mm to 8 mm.

The partition walls 13 define the plurality of cells 14. More specifically, the partition walls 13 each have a first partition wall 13a and a second partition wall 13b that are orthogonal to each other, and the first partition walls 13a and the second partition walls 13b define the plurality of cells 14. The sectional shape of each of the cells 14 is a quadrangular shape except for portions in which the first partition walls 13a and the second partition walls 13b are in contact with the outer peripheral wall 11.

The configuration of the honeycomb molded body is not limited to the above-mentioned configuration. Any appropriate configuration may be adopted in the honeycomb molded body depending on the application of the honeycomb structure. Although not shown, the honeycomb molded body may have a hollow region in a center portion thereof in the cross-section in the direction orthogonal to the axial direction (length direction). That is, the honeycomb molded body may have, for example, a tubular shape (specifically, a cylindrical shape, an elliptical tubular shape, or a square tubular shape). In addition, each of the partition walls of the honeycomb molded body may have a first partition wall extending in a radiation direction and a second partition wall extending in a circumferential direction, and the first partition walls and the second partition walls may define the plurality of cells.

The cell density (i.e., the number of the cells 14 per unit area) in the cross-section in the direction orthogonal to the axial direction of the honeycomb molded body may be appropriately set depending on the purpose. The cell density may be, for example, from 4 cells/cm$^2$ to 320 cells/cm$^2$. When the cell density falls within such range, the strength and effective geometric surface area (GSA) of the honeycomb structure can be sufficiently ensured.

The thickness of each of the partition walls 13 may be appropriately set depending on the application of the honeycomb structure. The thickness of each of the partition walls 13 is typically smaller than the thickness of the outer peripheral wall 11. The thickness of each of the partition walls 13 may be, for example, from 0.1 mm to 1.0 mm, or, for example, from 0.2 mm to 0.6 mm. When the thickness of each of the partition walls falls within such range, the honeycomb structure having sufficient mechanical strength can be obtained. In addition, a sufficient opening area (total area of the cells in the cross section) can be obtained.

The porosity in each of the outer peripheral wall 11 and the partition walls 13 may be appropriately set depending on the purpose. The porosity thereof is, for example, 15% or more, preferably 20% or more, and is, for example, 50% or less, preferably 45% or less. The porosity may be measured, for example, by mercury porosimetry. When the porosity in the outer peripheral wall and the partition walls falls within such ranges, a molten metal can be impregnated into the honeycomb molded body through use of a capillary force in an impregnation step.

The density in each of the outer peripheral wall 11 and the partition walls 13 may be appropriately set depending on the purpose. The density thereof is, for example, 1.7 g/cm$^3$ or more, preferably 1.8 g/cm$^3$ or more, and is, for example, 2.6 g/cm$^3$ or less, preferably 2.8 g/cm$^3$ or less. The density may be measured, for example, by mercury porosimetry. When the density of each of the outer peripheral wall and the partition walls falls within such ranges, voids can be formed inside the outer peripheral wall and the partition walls with the porosity described above.

The honeycomb molded body 1 contains SiC as a main component. For example, the term "SiC" as used herein is intended to encompass SiC containing unavoidable impurities as well as pure SiC. The constituent materials for the honeycomb molded body may also contain Al and/or Si in addition to SiC. The content ratio of SiC in the honeycomb molded body is, for example, 50 mass % or more, preferably 85 mass % or more, and is, for example, 100 mass % or less, preferably 95 mass % or less.

In one embodiment, the honeycomb molded body contains a binder in addition to the above-mentioned inorganic components (SiC, Al, and/or Si). With this configuration, the moldability of the honeycomb molded body can be improved. Examples of the binder include methyl cellulose, hydroxypropyl methylcellulose, hydroxypropyl cellulose, hydroxyethyl cellulose, carboxymethyl cellulose, and polyvinyl alcohol. Those binders may be used solely or in combination. Of the binders, methyl cellulose and hydroxypropyl cellulose are preferably used in combination. The content ratio of the binder in the honeycomb molded body is, for example, 0 mass % or more, preferably 2.0 mass % or more, and is, for example, 15.0 mass % or less, preferably 10.0 mass % or less. When the content ratio of the binder falls within the above-mentioned ranges, the moisture absorption amount of the honeycomb molded body after a storage step can be further stabilized.

Such honeycomb molded body may be produced by the following method. First, as required, a binder, water, or an organic solvent are added to inorganic material powder including SiC powder, and the resultant mixture is kneaded to form a plastic matter. The plastic matter is molded (typically extrusion-molded) into a desired shape and dried to produce a honeycomb molded body (honeycomb dry body). After that, as required, the honeycomb molded body is cut to a predetermined length. The length of the honeycomb molded body is, for example, from 3 mm to 200 mm, for example, from 5 mm to 100 mm, or for example, from 10 mm to 50 mm. Thus, the honeycomb molded body can be obtained.

C. Storage Step

Next, the honeycomb molded body 1 is stored under the conditions (temperature, humidity, and time) described in the above-mentioned section A. In one embodiment, the storage step is performed by allowing the honeycomb molded body 1 to stand still in a temperature and humidity-controlled booth in which temperature and humidity can be adjusted. The moisture absorption amount of the honeycomb molded body may be influenced by the environment in a step before a fitting step. As the moisture absorption amount of the honeycomb molded body increases, the honeycomb molded body expands to become larger. For this reason, for example, when the honeycomb molded body is subjected to the outer surface processing step without consideration of the moisture absorption amount of the honeycomb molded body, deviation from the target value of the external dimension (outer diameter dimension) of the honeycomb molded body in the outer surface processing step may occur due to the influence of the moisture absorption amount (expansion amount) of the honeycomb molded body. According to one embodiment of the present invention, the storage step is performed, and hence the moisture absorption amount (expansion amount) of the honeycomb molded body after the storage step can be stabilized. Thus, the conditions of the outer surface processing step and the target value of the dimension can be set in consideration of the moisture absorption amount (expansion amount) of the honeycomb molded body after the storage step, and the honeycomb molded body can be stably adjusted to the desired external dimension range (outer diameter range). As a result, a honeycomb structure excellent in external dimension accuracy can be manufactured.

D. Outer Surface Processing Step

In one embodiment, as illustrated in FIG. 2, the outer surface processing step is performed after the completion of the storage step. As a result, the external dimension accuracy of the honeycomb structure can be further improved. The period of time from the completion of the storage step to the start of the outer surface processing step is, for example, within 8 hours, preferably within 4 hours. In the outer surface processing step, temperature and humidity may be controlled in the same manner as in the storage step or may not be controlled. In the outer surface processing step, the outer surface of the honeycomb molded body 1 (outer peripheral surface of the outer peripheral wall 11) is processed by any appropriate cutting means. As a result, the outer peripheral wall 11 of the honeycomb molded body 1 may be reduced in thickness. In addition, in the outer surface processing step, an opening may be formed in the outer peripheral wall 11 in addition to the processing of the outer peripheral surface of the outer peripheral wall 11.

As the cutting means, there is given, for example, a grinding stone. The grain size of the grinding stone is, for example, #100 or more, preferably from #90 to #140. The diameter of the grinding stone is, for example, 20 mm or more, and for example, 100 mm or less, preferably 60 mm or less. The peripheral speed of the grinding stone is, for example, 6.0 seconds or more. Cutting by the grinding stone is preferably performed while the honeycomb molded body to be cut is rotated. The rotation speed of the honeycomb molded body is, for example, from 5 rpm to 500 rpm, preferably from 10 rpm to 300 rpm.

Any appropriate combination of the grain size, the diameter, and the peripheral speed of the grinding stone may be adopted. For example, when the diameter and the grain size of the grinding stone are small, the honeycomb molded body can be smoothly processed by increasing the rotation number.

The thickness of the outer peripheral wall 11 after the outer surface processing step is, for example, from 0.3 mm to 10 mm, or for example, from 0.5 mm to 5 mm. When the thickness of the outer peripheral wall falls within such ranges, the fracture (e.g., flaws and cracks) of the wall caused by an external force can be prevented.

The outer diameter of the honeycomb molded body after the outer surface processing step is, for example, from 20 mm to 200 mm, or for example, from 30 mm to 100 mm. When the sectional shape of the honeycomb molded body is not a circular shape, the diameter of a maximum inscribed circle inscribed in the sectional shape (e.g., polygonal shape) of the honeycomb molded body can be defined as the outer diameter of the honeycomb structure.

The arithmetic average roughness Ra of the outer surface of the honeycomb molded body 1 (outer peripheral surface of the outer peripheral wall 11) as specified by JIS B 0601:2013 is, for example, 10 μm or less, preferably 5 μm or less. When the Ra of the outer surface of the honeycomb molded body (outer peripheral surface of the outer peripheral wall) falls within such ranges, the honeycomb molded body can be stably fixed to the inside of a metal tube without forming a layer (typically, a mat layer) interposed between the honeycomb molded body and the metal tube in the honeycomb structure described later.

E. Impregnation Step

In one embodiment, the impregnation step is performed after the outer surface processing step. As a result, a molten metal containing Si can be impregnated into the honeycomb molded body, and the honeycomb molded body can be formed of a Si—SiC-based composite material. In the impregnation step, a supply body containing Si is first brought into contact with the honeycomb molded body after the outer surface processing. Any appropriate shape and size may be adopted in the supply body as long as the supply body can be brought into contact with the honeycomb molded body in the impregnation step, and the supply body can be arranged at any appropriate position.

The supply body contains Si as a main component as described above. The constituent materials for the supply body may also contain Al in addition to Si. The content ratio of Si in the supply body is, for example, 50 mass % or more, preferably 90 mass % or more, more preferably 95 mass % or more, and is, for example, 100 mass % or less, preferably 97 mass % or less, more preferably 96 mass % or less. When the content ratio of Si in the supply body falls within such ranges, the molten metal containing Si can be uniformly impregnated into the entire honeycomb molded body in the impregnation step. The usage amount of the supply body is, for example, 20 parts by mass or more, preferably 30 parts by mass or more, and is, for example, 80 parts by mass or less, preferably 70 parts by mass or less with respect to 100 parts by mass of the honeycomb molded body.

Then, the honeycomb molded body and the supply body are collectively heated under a state in which the supply body is in contact with the honeycomb molded body.

The heating temperature is, for example, 1,200° C. or more, preferably 1,300° C. or more, and is, for example, 1,600° C. or less, preferably 1,500° C. or less. The heating time is, for example, 10 minutes or more, preferably 1 hour or more. When the heating temperature falls within the above-mentioned ranges, and/or the heating time is equal to or more than the above-mentioned lower limit, the molten metal containing Si can be smoothly impregnated into the honeycomb molded body. The upper limit of the heating time is typically 10 hours or less, preferably 5 hours or less. When the heating time is equal to lower than the above-mentioned upper limit, the manufacturing efficiency of the honeycomb structure can be improved.

In addition, the impregnation step is performed preferably under reduced pressure. When the impregnation step is performed under reduced pressure, the molten metal containing Si can be further smoothly impregnated into the honeycomb molded body. The pressure in the impregnation step is, for example, 500 Pa or less, preferably 300 Pa or less, more preferably 200 Pa or less, and is typically 10 Pa or more. The impregnation step may also be performed under normal pressure (0.1 MPa).

F. Fitting Step

Next, as illustrated in FIG. 3, the honeycomb molded body 1 is fitted into a metal tube 2 by so-called shrink fitting. The term "fitted" as used herein refers to that the honeycomb molded body and the metal tube are fixed in a mutually fitted state.

As the metal tube 2, any appropriate configuration may be adopted as long as the metal tube 2 can cover the outer peripheral wall 11 of the honeycomb molded body 1. As the metal tube 2, for example, a tubular member that is fitted to the outer peripheral wall 11 of the honeycomb molded body 1 to circumferentially cover the outer peripheral wall 11 of the honeycomb molded body 1 may be used. Examples of the material for the metal tube 2 include stainless steel, iron, a titanium alloy, a copper alloy, an aluminum alloy, and brass, and stainless steel and iron are preferred.

The length of the metal tube 2 is typically larger than the length of the honeycomb molded body 1. When the length of the honeycomb molded body is defined as 100%, the length of the metal tube is, for example, 100% or more, preferably 110% or more, and is, for example, 1,000% or less, preferably 500% or less. The length of the metal tube 2 is, for example, from 3 mm to 200 mm, for example, from 20 mm to 150 mm, or for example, from 30 mm to 100 mm.

The thickness of the metal tube 2 is, for example, from 0.1 mm to 10 mm, for example, from 0.3 mm to 5 mm, or for example, from 0.5 mm to 3 mm.

The arithmetic average roughness Ra of the inner surface of the metal tube 2 (inner peripheral surface) as specified by JIS B 0601:2013 is, for example, 10 μm or less, preferably 5 μm or less.

In one embodiment, the inner diameter of the metal tube 2 at room temperature (23° C.) is equal to or less than the outer diameter of the honeycomb molded body 1. When the outer diameter of the honeycomb molded body 1 at room temperature is defined as 100%, the inner diameter of the metal tube 2 at room temperature is, for example, from 99.0% to 100%, or for example, from 99.0% to 99.9%.

In the fitting step, the metal tube 2 as described above is expanded by heating so that the inner diameter of the metal tube 2 exceeds the outer diameter of the honeycomb molded body 1. The heating temperature is, for example, 600° C. or more, preferably 800° C. or more, and is, for example, 2,000° C. or less, preferably 1,200° C. or less.

Then, the honeycomb molded body 1 is inserted into the heated metal tube 2. When the length of the metal tube 2 is larger than the length of the honeycomb molded body 1, the honeycomb molded body 1 is typically arranged in a center portion of the metal tube 2 (i.e., so that the honeycomb molded body is not exposed from the metal tube). After that, the honeycomb molded body 1 and the metal tube 2 are cooled to room temperature (23° C.)

As a result, the metal tube 2 is shrunk to be brought into contract with the honeycomb molded body 1, and the honeycomb molded body 1 is fixed to the metal tube 2. Thus, a honeycomb structure 100 is manufactured as illustrated in FIG. 4 and FIG. 5.

G. Honeycomb Structure

The honeycomb structure 100 includes the honeycomb molded body 1 and the metal tube 2 having the honeycomb molded body 1 inserted therein. In one embodiment, the metal tube 2 includes: a large-diameter portion 21 that is in contact with the honeycomb molded body 1; and small-diameter portions 22 that are prevented from being in contact with the honeycomb molded body 1.

The honeycomb molded body 1 is not positioned on an inner side of each of the small-diameter portions 22. The small-diameter portions 22 are typically positioned in both end portions of the metal tube 2. In the illustrated example, the small-diameter portion 22 is positioned in each of the end portions of the metal tube 2 but may be positioned in any one of the end portions of the metal tube 2. An inner diameter D2 of the small-diameter portion 22 is substantially the same over the entire length direction of the small diameter portion 22. The range of the inner diameter D2 of the small-diameter portion 22 is the same as the above-mentioned range of the inner diameter of the metal tube at room temperature. The length of the small-diameter portion 22 is, for example, from 0% to 90%, or for example, from 10% to 50% with respect to the total length of the metal tube 2.

The inner surface of the large-diameter portion 21 is in direct contact with the outer surface of the honeycomb molded body 1 (outer peripheral surface of the outer peripheral wall 11). There is no layer interposed between the large-diameter portion 21 and the honeycomb molded body 1. An inner diameter D1 of the large-diameter portion 21 is substantially the same over the entire length direction of the large-diameter portion 21. The range of the inner diameter D1 of the large-diameter portion 21 is the same as the above-mentioned range of the outer diameter of the honeycomb molded body.

When the inner diameter D2 of the small-diameter portion 22 is defined as 100%, the inner diameter D1 of the large-diameter portion 21 is 100.1% or more and 101.0% or less, preferably 100.2% or more and 100.8% or less, more preferably 100.3% or more and 100.6% or less. When the inner diameter of the large-diameter portion falls within such ranges, the performance of the honeycomb structure can be sufficiently ensured.

The metal tube 2 may further include a connecting portion 23 that connects the large-diameter portion 21 and the small-diameter portion 22 to each other. The connecting portion 23 is not in contact with the honeycomb molded body 1, and the honeycomb molded body 1 is not positioned on an inner side of the connecting portion 23. The inner diameter of the connecting portion 23 is gradually increased from the small-diameter portion 22 to the large-diameter portion 21.

The honeycomb structure 100 is manufactured by the method of manufacturing a honeycomb structure described in the above-mentioned sections A to F, and hence has excellent external dimension accuracy (outer diameter accuracy). When the honeycomb structure is manufactured by a manufacturing method that does not include a storage step, the external dimension of the honeycomb structure may vary on the order of several hundred micrometers from one manufacturing to another. Meanwhile, in one embodiment of the present invention, the honeycomb structure is manufactured by the manufacturing method that includes the storage step, and hence the variation in external dimension of the honeycomb structure for each manufacturing is on the order of tens of micrometers, and the external dimension accuracy (outer diameter accuracy) is significantly improved.

H. Modification Example

In the one embodiment described above, the impregnation step is performed after the outer surface processing step and before the fitting step, but the order of the outer surface processing step and the impregnation step is not limited thereto. The impregnation step may be performed after the storage step and before the outer surface processing step. In this case, the outer surface of the honeycomb molded body is processed after the molten metal is impregnated into the honeycomb molded body, and hence the processing accuracy can be improved. When the outer surface processing step is performed before the impregnation step as in the one embodiment described above, the outer surface of the honeycomb molded body can be smoothly processed as compared to the case in which the outer surface processing step is performed after the impregnation step. Accordingly, the order of the outer surface processing step and the impregnation step may be appropriately changed depending on the purpose.

EXAMPLES

Now, the present invention is specifically described by way of Examples. However, the present invention is not limited to these Examples.

Examples 1 to 4

A plastic matter containing SiC powder and a binder was extrusion-molded into the shape illustrated in FIG. 1 and then dried to provide a honeycomb molded body.

Then, the honeycomb molded body was stored in a temperature and humidity-controlled booth in which temperature and humidity were controlled to ranges shown in Table 1 for a period of time shown in Table 1.

Next, the honeycomb molded body after storage was subjected to outer surface processing by an outer periphery processing machine. The period of time from the completion of the storage step to the start of the outer surface processing step was from 0 seconds to 180 seconds. The honeycomb molded body after the outer surface processing had an outer peripheral wall (outer diameter: 80 mm) and partition walls that are positioned in the outer peripheral wall and define a plurality of cells. The length of the honeycomb molded body was 50 mm. The cell density in the honeycomb molded body was 300 cells/cm$^2$, the thickness of each of the partition walls was 0.5 mm, and the thickness of the outer peripheral wall was 2 mm.

Then, under a state in which a supply body containing Si was in contact with the honeycomb molded body, heating was performed at 1,500° C. for 4 hours under reduced pressure (200 Pa), to thereby impregnate a molten metal containing Si into the honeycomb molded body.

Then, the honeycomb molded body after impregnation was inserted into a metal tube (stainless steel tube having a length of 80 mm) that had been expanded by heating to 1,000° C. After that, the resultant was cooled to shrink the metal tube (shrink fitting). As a result, the honeycomb molded body was fitted into the metal tube to provide a honeycomb structure.

In the honeycomb structure, the metal tube had a large-diameter portion that was in contact with the honeycomb molded body and small-diameter portions that were positioned in end portions of the metal tube and were not in contact with the honeycomb molded body. The ratio (D1/D2×100) of the inner diameter D1 of the large-diameter portion when the inner diameter D2 of the small-diameter portion is defined as 100% is shown in Table 1.

TABLE 1

| | | | No. | | | |
|---|---|---|---|---|---|---|
| | | | Example 1 | Example 2 | Example 3 | Example 4 |
| Storage step | Temperature | [° C.] | 20 ± 2 | 20 ± 2 | 20 ± 4 | 20 ± 2 |
| | Humidity | [g/m$^3$] | 3 ± 2 | 3 ± 4 | 3 ± 2 | 3 ± 2 |
| | Time | [hr] | 8 | 8 | 8 | 2 |
| D1/D2 × 100 | | [%] | 100.3 to 100.6 | 100.2 to 100.8 | 100.1 to 100.8 | 100.1 to 100.8 |
| Evaluation | | [—] | A | B | C | C |

The method of manufacturing a honeycomb structure according to at least one embodiment of the present invention is used in manufacturing of various industrial products, and may be suitably used, in particular, in manufacturing of a heat exchanger.

According to the at least one embodiment of the present invention, the honeycomb structure excellent in external dimension accuracy can be manufactured.

What is claimed is:

1. A method of manufacturing a honeycomb structure, comprising:
   a preparation step of extruding a plastic matter to produce a honeycomb molded body;
   a drying step of drying the honeycomb molded body to produce a dried honeycomb molded body;
   a storage step of storing the dried honeycomb molded body under a state in which temperature and humidity are adjusted; and
   a fitting step of inserting dried honeycomb molded body after the completion of the storage step into a heated metal tube and then cooling the metal tube;
   wherein a temperature during the storage step is set to 0° C. to 30° C.; and
   wherein, in the storage step, a variation amount of temperature is 10° C. or less, a variation amount of humidity is 8 g/m$^3$ or less, and a storage time is 1 hour or more.

2. The method of manufacturing a honeycomb structure according to claim 1, further comprising, after the storage step and before the fitting step, an outer surface processing step of processing an outer surface of the dried honeycomb molded body.

3. The method of manufacturing a honeycomb structure according to claim 2, wherein the honeycomb molded body contains SiC.

4. The method of manufacturing a honeycomb structure according to claim 3, further comprising, after the outer surface processing step and before the fitting step, an impregnation step of impregnating a molten metal containing Si into the dried honeycomb molded body by heating a supply body containing Si under a state in which the supply body containing Si is in contact with the dried honeycomb molded body.

5. The method of manufacturing a honeycomb structure according to claim 3, further comprising, after the storage step and before the outer surface processing step, an impregnation step of impregnating a molten metal containing Si into the dried honeycomb molded body by heating a supply body containing Si under a state in which the supply body containing Si is in contact with the dried honeycomb molded body.

6. A method of manufacturing a honeycomb structure, comprising:
   a preparation step of extruding a plastic matter to produce a honeycomb molded body;
   a drying step of drying the honeycomb molded body to produce a dried honeycomb molded body;
   a storage step of storing the dried honeycomb molded body under a state in which temperature and humidity are adjusted;
   a fitting step of inserting the dried honeycomb molded body after the completion of the storage step into a heated metal tube and then cooling the metal tube; and
   an outer surface processing step of processing an outer surface of the dried honeycomb molded body after the storage step and before the fitting step,
   wherein the honeycomb molded body contains SiC, and
   wherein, in the storage step, a temperature is set to 0° C. to 30° C., a variation amount of temperature is 10° C. or less, a variation amount of humidity is 8 g/m$^3$ or less, and a storage time is 1 hour or more.

7. The method of manufacturing a honeycomb structure according to claim 6, further comprising, after the outer surface processing step and before the fitting step, an impregnation step of impregnating a molten metal containing Si into the dried honeycomb molded body by heating a supply body containing Si under a state in which the supply body containing Si is in contact with the dried honeycomb molded body.

8. The method of manufacturing a honeycomb structure according to claim 6, further comprising, after the storage step and before the outer surface processing step, an impregnation step of impregnating a molten metal containing Si into the dried honeycomb molded body by heating a supply body containing Si under a state in which the supply body containing Si is in contact with the dried honeycomb molded body.

* * * * *